United States Patent
Schoettle et al.

(12) 
(10) Patent No.: US 10,598,383 B1
(45) Date of Patent: Mar. 24, 2020

(54) ADJUSTABLE HEIGHT GRILL TOP

(71) Applicants: Steven J Schoettle, St. Simons Island, GA (US); Randie A. Whisenant, Brunswick, GA (US)

(72) Inventors: Steven J Schoettle, St. Simons Island, GA (US); Randie A. Whisenant, Brunswick, GA (US)

( * ) Notice: Subject to any disclaimer, the term of this patent is extended or adjusted under 35 U.S.C. 154(b) by 612 days.

(21) Appl. No.: 15/349,686

(22) Filed: Nov. 11, 2016

(51) Int. Cl.
*F24B 1/18* (2006.01)
*F24B 1/00* (2006.01)

(52) U.S. Cl.
CPC .................................. *F24B 1/003* (2013.01)

(58) Field of Classification Search
CPC ....................................................... F24B 1/003
See application file for complete search history.

(56) References Cited

U.S. PATENT DOCUMENTS

| | | | | |
|---|---|---|---|---|
| 2,764,223 A * | 9/1956 | Mischke | .................. | A47C 3/18 248/418 |
| 2,844,139 A * | 7/1958 | Lucas | ..................... | A47J 33/00 126/25 A |
| 2,912,973 A * | 11/1959 | Lucas | .................. | A47J 37/0763 126/30 |
| 3,067,734 A * | 12/1962 | Lucas | .................. | A47J 37/0763 126/30 |
| 3,152,536 A * | 10/1964 | Lucas | .................. | A47J 37/0763 126/30 |
| 3,632,085 A * | 1/1972 | Traywick | .................. | B66F 5/04 254/10 B |
| 3,825,228 A * | 7/1974 | Greutman | ............... | B25B 25/00 254/237 |
| 4,248,405 A * | 2/1981 | Kameda | .................... | B66F 5/04 254/10 B |

* cited by examiner

*Primary Examiner* — Steven B McAllister
*Assistant Examiner* — John E Bargero
(74) *Attorney, Agent, or Firm* — Jonathan R. Smith; Jonathan Rigdon Smith, J.D., PC (57) ABSTRACT

A grill top that can be removably attached to a barbecue grill fire basin has a lever that adjusts the height of the rack above the fire basin. The lever handle is located well away from the fire. A ratchet mechanism holds the rack at a selected height, and parallelogram bars maintain the rack in a horizontal orientation.

12 Claims, 5 Drawing Sheets

ADJUSTABLE HEIGHT GRILL TOP

CROSS-REFERENCES TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A BIOLOGICAL SEQUENCE LISTING

Not applicable.

BACKGROUND OF INVENTION

Field of the Invention

This invention is in the field of supports, more specifically in the field of cooking grill tops, more specifically in the field of barbecue grill tops, and still more specifically in the field of grill tops that are adjustable and/or removable from the fire basin of a grill.

Description of the Related Art

In common usage, and particularly in the following description, a barbecue or cooking "grill" refers to an entire apparatus for cooking foodstuffs. The basic sub-components are: the fire box or bowl, which holds the fuel itself or burners, herein called a "fire basin" or "basin," and the grid for supporting the food above the fire, herein called a "rack." The entire apparatus connecting the rack to the basin and supporting it thereon is called the "grill top."

In many grills, the rack may be removable (for cleaning, for example) but is in a fixed position relative to the source of heat. Such grills adjust the heat applied to the food by adjusting the intensity of the fire rather than the position of the food relative to the fire. If the fire is produced by an adjustable fuel such as propane, the application of heat to the food generally does not require moving the food towards or away from the fire. With a charcoal or wood fire, on the other hand, fuel adjustment is often too slow, and quick movement of the food may be necessary.

Some grills, such as the Marsh Allen Cast Iron Hibachi Charcoal Grill Model 30052 by Kay Home Products of Antioch, Ill., allow a rack to be raised and lowered by providing rack-supporting vertical bars at the back of the grill. Pairs of notches are cast into these bars, which engage and hold the rear edge of the rack. A user grasps a handle on the front of the rack and lifts the entire rack, along with the food, out of one pair of notches, and reinserts the rear of the rack into another pair of higher or lower notches. The drawback here is that the racks are necessarily small so that a user can handle the entire weight.

Another type of grill that moves the food relative to the fire is represented by U.S. Pat. No. 3,126,881 to Blotsky. It has a central rack-bearing mast that can be raised and lowered by a lever below the grill. In Blotsky, the lever is pivoted up and down by a threaded crank mounted at the side of the grill. Such an arrangement can handle somewhat larger weight, but has the drawback that when the mechanism is eventually contaminated by ash and dirt, it will be hard to operate and difficult to clean.

BRIEF DESCRIPTION OF THE INVENTION

Objects of the Invention

The principal object of the invention is to allow a large and/or heavy rack of food to be adjusted in height above the fire with little effort. Another object of the invention is to provide such an adjustment means that can be fixed, or removably attached, to a variety of grills or fire basins.

SUMMARY OF THE INVENTION

The present invention is a grill top that can be removably attached to a barbecue grill fire basin, comprising a lever that adjusts the height of the rack above the fire basin. The lever handle is located well away from the fire. A ratchet mechanism holds the rack at a selected height, and an arrangement of parallelogram bars maintains the rack in a horizontal orientation. The lever has a fulcrum that is near the edge of the fire basin. Downward pressure on the lever handle supports the weight of the rack and the food. The length of the handle allows the user to adjust the rack height with a small amount of downward pressure. The rack is connected to the lever by the parallelogram bars. One or more ratchet bars set the height of the rack by fixing the distance between the parallelogram bars. The ratchet bar or bars self-engage the parallelogram bars under their own weight. A user can easily disengage the ratchet bar or bars by pushing a corresponding tab or tabs.

These and other benefits will be more clearly illustrated in the following detailed description and drawings.

DETAILED DESCRIPTION OF THE INVENTION

Figure 1:
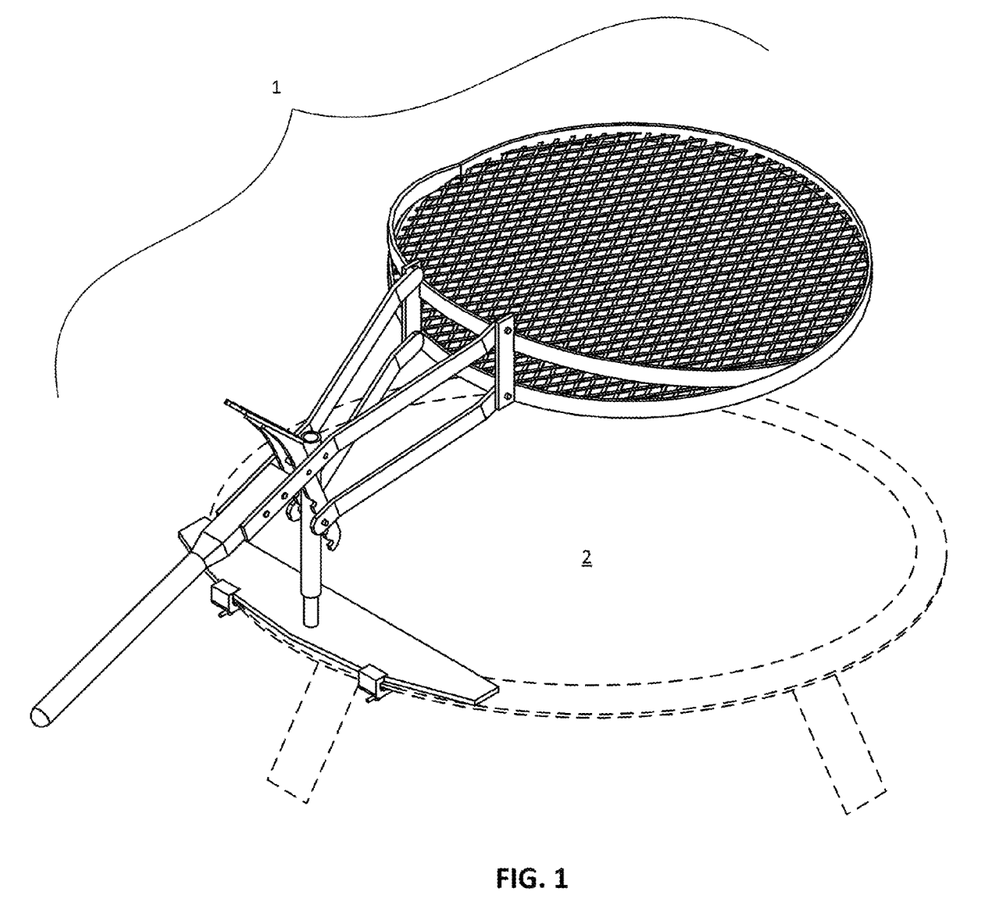
FIG. 1 is an oblique view of a preferred embodiment of the invention.

Referring now to the drawings, in which like reference characters refer to like elements among the drawings, FIG. 1 is an oblique view of a preferred embodiment of the invention 1 attached to a fire basin 2 (shown in dashed lines to indicate environmental structure).

Figure 2:
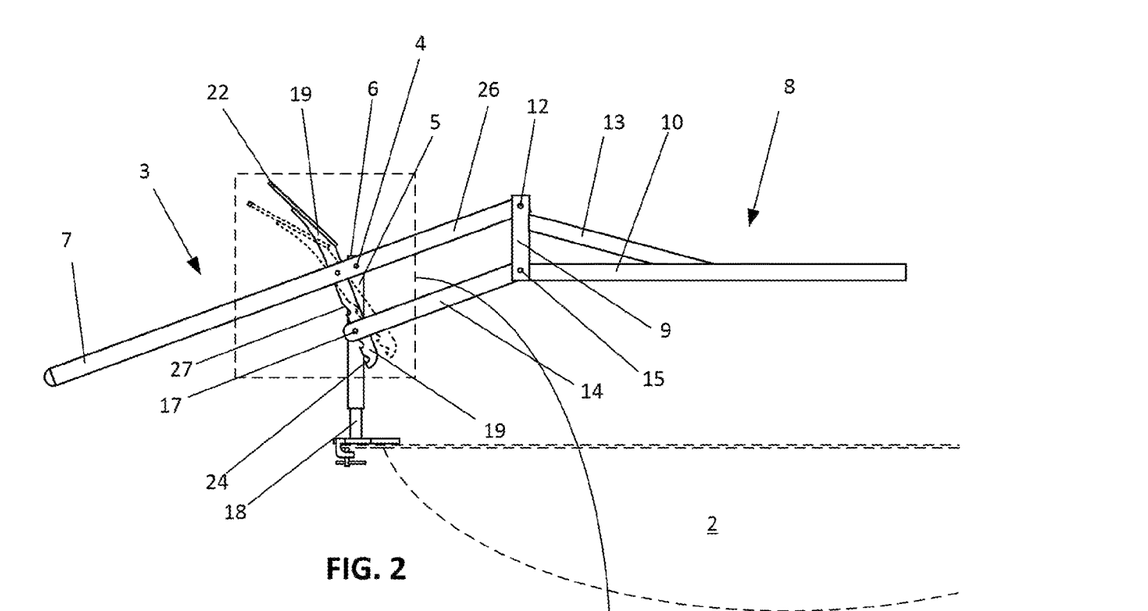
FIG. 2 is a side view of a preferred embodiment of the invention.

FIG. 2 is a side view of embodiments of the invention including the first embodiment. A handle member 3 pivots, in a vertical plane, on a fulcrum pin 4 on the upper portion 5 of a vertical collar 6. The fulcrum pin 4 is the first pivot point of a parallelogram arrangement designed to maintain a grill rack 8 in a horizontal orientation. At the left end of handle member 3 in this view is a handle 7. The grill rack 8 is attached to the right end 26 of the handle member 3 by means of a vertical lift member 9 attached to the periphery 10 of the grill rack 8. The right end 26 of the handle member 3 is pivotably attached to the vertical lift member 9 by a second pin at second pivot point 12. At least one rack brace 13 is fixed between the top end of the vertical lift member 9 and at least one point on the periphery 10 of the grill rack 8 to reduce bending moment at the joint between the vertical lift member 9 and the periphery 10. The scope of this invention includes equivalent bracing means. A parallelogram bar 14 is pivotably attached at its inner end (end closest to the rack) to the bottom end of the vertical lift member 9 by a third pin at third pivot point 15, and is pivotably attached at its outer end to a lower portion of the collar 6 by a fourth pin at fourth pivot point 17.

The collar 6 has a hollow cylindrical inner surface (not visible in this view, see FIGS. 5 and 7) and is supported by a vertical post 18 that fits within it. Across the cylindrical inner surface of the upper portion 5 is a rigid rod (not visible in this view) that contacts the top of the post 18 and serves as a bearing to hold the weight of collar 6, and the other parts listed above as well as the food being cooked. Conveniently, this rigid rod can be part of the fulcrum pin 4.

The height of the grill rack 8 above the fire basin 2 is determined by the length of the normal between the handle 7 and the parallelogram bar 14, which in turn is governed by the position of the ratchet bar 19.

Figure 3:
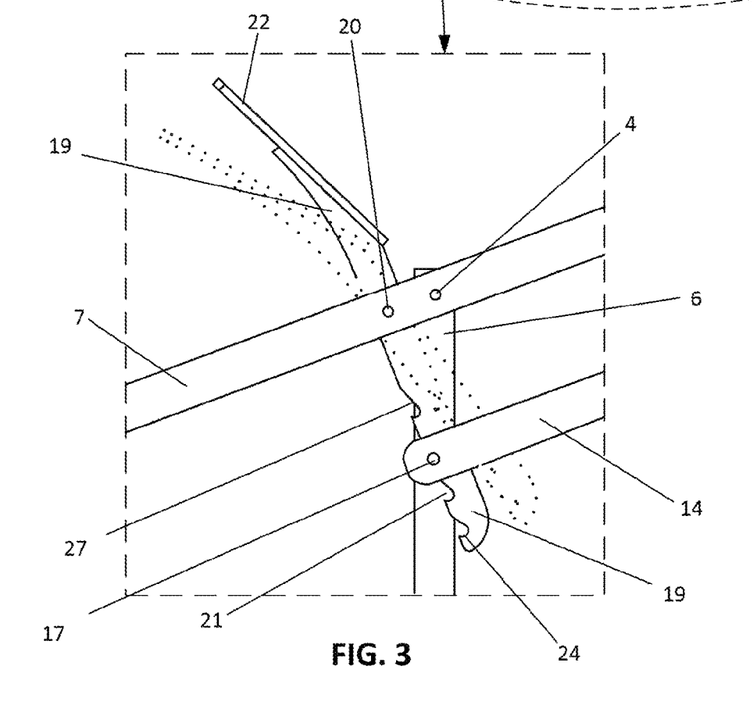
FIG. 3 is an inset from FIG. 2.

FIG. 3 is an enlargement of the dashed rectangular inset shown in FIG. 2, better showing the details of the ratchet bar 19 and its movement. The ratchet bar 19 pivots about a ratchet pin at a fifth pivot point 20 through the handle member 3, located to the left of the fulcrum pin 4. The ratchet pin at the fifth pivot point 20 is raised and lowered, respectively, by raising and lowering handle 7. The weight of the grill rack and other parts to the right of vertical collar 6 urges the fifth pivot point 20 upward (clockwise about the fulcrum pin 4 in this view) and the weight of the ratchet bar 19 to the right of the fifth pivot point 20 urges the ratchet bar 19 clockwise about the fifth pivot point 20 in this view so that one of the four shaped notches 21 on the left side of the ratchet bar 19 (in this view, the third such notch from the bottom of the ratchet bar 19) engages a pawl fixed to the lower portion of the collar 6. This pawl is conveniently made part of a rod perpendicular to the plane of the sheet at the fourth pivot point 17, which is fixed to the collar 6 and about which the parallelogram bar 14 can rotate in a vertical plane. In this view, the pawl occupies a space (not visible in this view) between the collar 6 and the parallelogram bar 14 that allows one of the four shaped notches 21 to grip the pawl. The shape of the notches 21 includes a hook 24 at the bottom of each notch 21. The hook 24 resists upward movement of the ratchet bar 19 against the pawl, and consequently resists inadvertent disengagement of a notch 21 from the pawl under the weight of the grill rack. The shape of the notches 21 further includes a smooth upper part 27 of each notch 21. This feature allows easy release of the ratchet bar 19 from the pawl when the handle 7 is pressed down so as to raise the grill rack.

With downward pressure on the handle 7, a tab 22 on the ratchet bar 19 can be pressed to the left, moving the ratchet bar 19 to a new position (dotted line) thereby releasing the notch from the pawl and allowing the handle 7 to be raised or lowered. When the tab 22 is released, the weight of the ratchet bar 19 allows another shaped notch on the ratchet bar 19 to grip the pawl.

Figure 4:
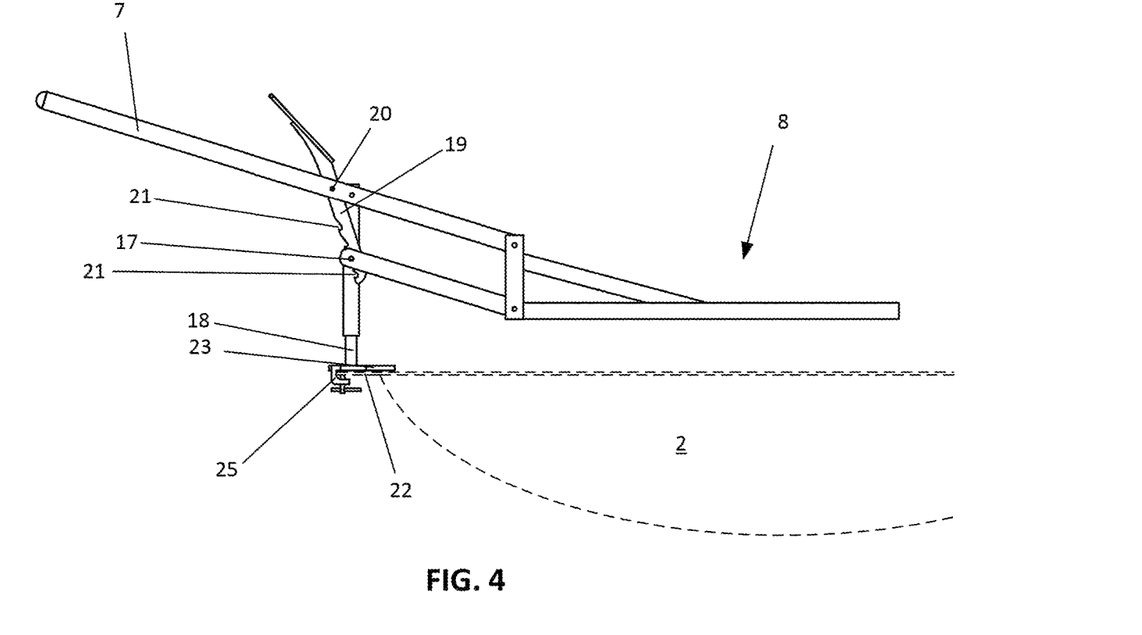
FIG. 4 is a side view of the invention at a different height setting.

FIG. 4 is a side view of the invention at a different height setting. Handle 7 has been raised, allowing another of the four shaped notches 21, the second from the bottom of the ratchet bar 19 in this view, to grip the pawl at the fourth pivot point 17. The grill rack 8 is now closer to the fire basin 2 than in FIG. 2. In embodiments, means other than this for releasably setting the height of the grill rack 8 relative to the fire basin 2 may be used, such as a rigid prop of adjustable height.

Also visible in this view is a means for the invention to grip a grill, in this case the horizontal lip 22 of the fire basin 2. A horizontal plate 23 fixed to the lower end of the vertical post 18 is placed on top of the lip 22 and clamped to the lip 22 by a clamp 25. The scope of the present invention includes equivalent means known in the art for fastening a vertical post to another object, whether or not that object has a horizontal flange.

Figure 5:
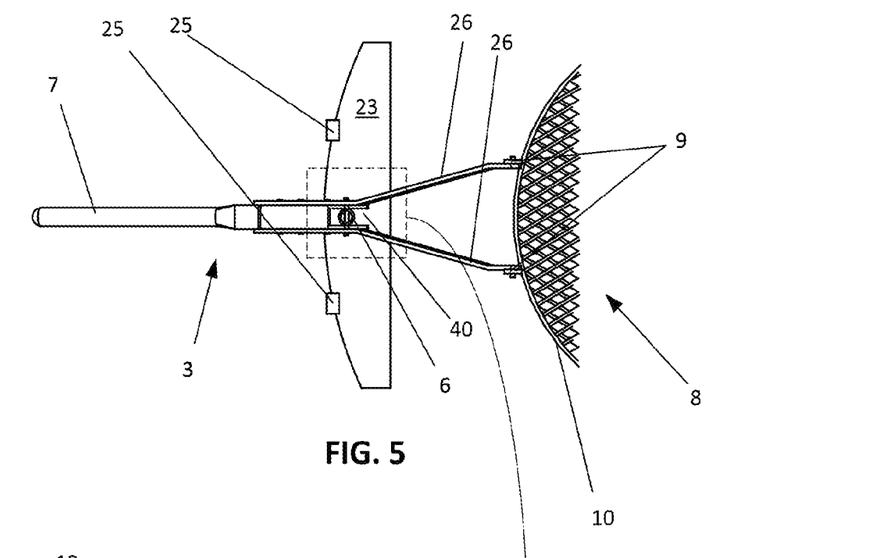
FIG. 5 is a partial top view of the preferred embodiment of the invention.

FIG. 5 is a partial top view of the preferred embodiment of the invention. It shows that in the preferred embodiment, the right end 26 of the handle member 3 is forked for horizontal stability. There are therefore two vertical lift members 9. The handle member 3 is also split near its midpoint so that the vertical collar 6 occupies a space 40 within the handle member 3. This view also shows the horizontal plate 23 and two clamps 25.

Figure 6:
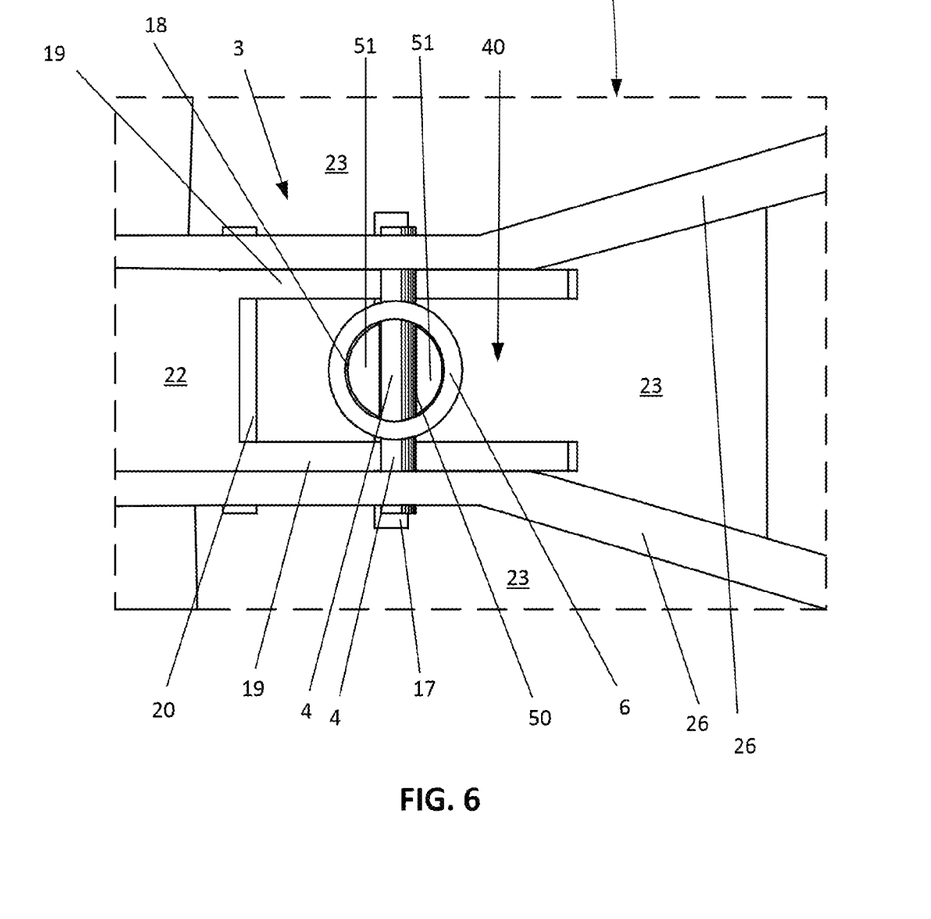
FIG. 6 is a view of an inset from FIG. 5.

FIG. 6 is a view of an inset from FIG. 5 more clearly showing parts of a top view of detail surrounding and within the collar 6. The entire weight of the handle portion 3 and grill rack 8 (not shown in the inset) is borne by fulcrum pin 4. Fulcrum pin 4 passes through the vertical collar 6 and can be fixed to either the handle portion 3 or the vertical collar 6, but not both, thus allowing the handle portion 3 to rotate in a vertical plane (normal to the sheet plane). The top of the vertical post 18 has a flat horizontal face 51. Normally, fulcrum pin 4 rests in a semi-cylindrical groove 50 in this flat horizontal face 51 of the vertical post 18.

Also shown here is that, in the preferred embodiment, the ratchet bar 19 is two halves on either side of the vertical collar 6, which pivot on a rod at the fifth pivot point 20. The tab 22 joins the two halves of ratchet bar 19. Optionally, each half of the ratchet bar 19 can operate separately by dividing the tab 22 in half vertically. Also shown in FIG. 6 are the forked right ends 26 of the handle member 3, as well as horizontal plate 3.

Figure 7:
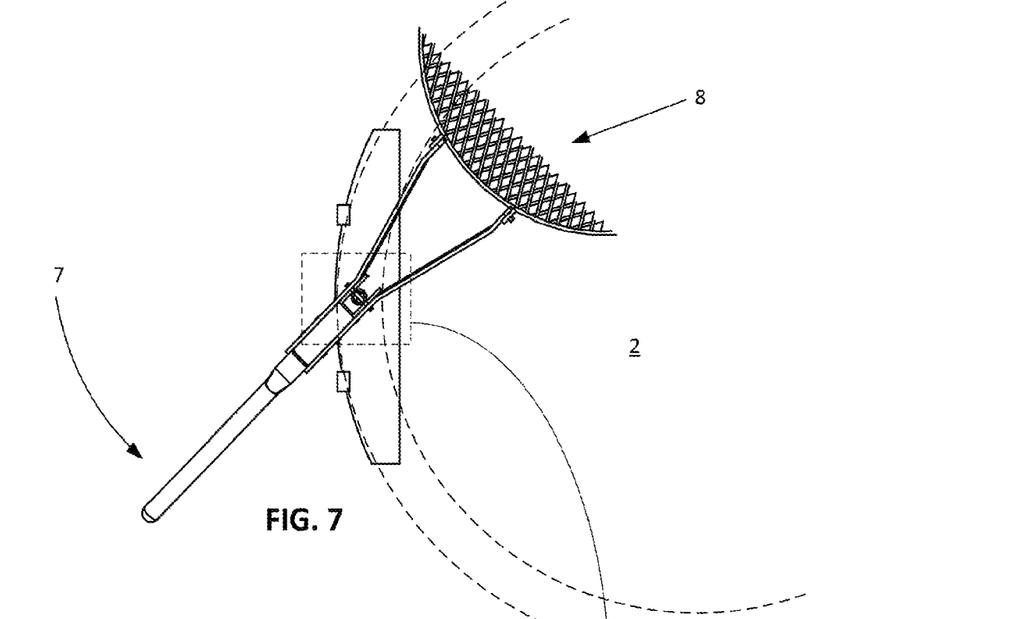
FIG. 7 is a partial top view of the preferred embodiment of the invention at a different azimuthal angle.

FIG. 7 is a partial top view of the invention at a different azimuthal angle from FIG. 5. Handle 7 has been rotated counterclockwise in this view to move the grill rack 8 away from the fire in the fire basin 2 (shown here in dashed lines to indicate environmental structure).

Figure 8:
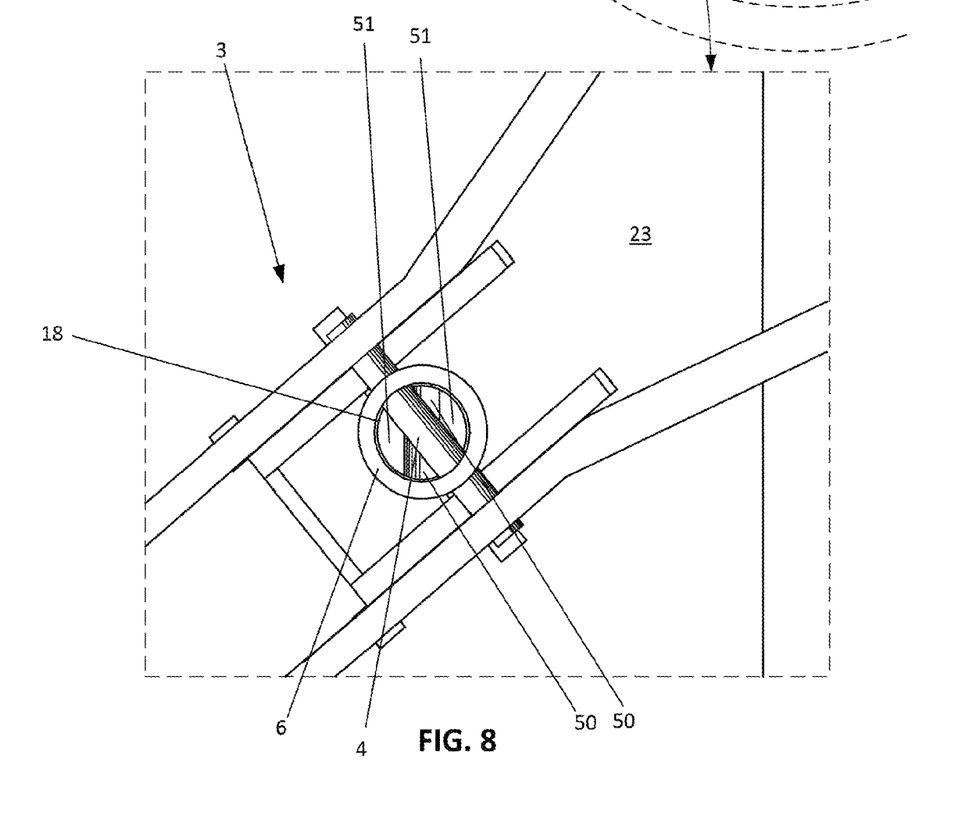
FIG. 8 is a view of an inset from FIG. 7.

FIG. 8 is a view of an inset from FIG. 7. Handle member 3, fulcrum pin 4 and vertical collar 6 have all been rotated counterclockwise as in FIG. 7. This has caused the fulcrum pin 4 to leave the semi-cylindrical groove 50 in the horizontal upward face 51 in the top of the vertical post 18, which remains stationary because the vertical post 18 is fixed to the horizontal plate 23. By moving out of the semi-cylindrical groove 50, the fulcrum pin 4 rises a small amount (toward the viewer in this view) to rest on the horizontal upward face 51. Because of this rise, the semi-cylindrical groove 50 acts as a detent to center the grill rack over the fire basin 2 in its most stable state. Rounding of the top edges of the semi-cylindrical groove 50 will make it easier for the fulcrum pin 4 to release from, and re-enter, the semi-cylindrical groove 50. Other detent means that operate in an equivalent manner are within the scope of this invention.

In embodiments, the grill top in its most basic form need not have a hollow cylinder around a central post. A second vertical member may be substituted for the hollow cylinder, with means other than cooperating detents to support it while still allowing the two to revolve about each other in a horizontal plane, with or without a detent to urge the grill rack into a position over the fire basin.

Similarly, there need not be a specific vertical lift member 9 attached to the periphery 10 of the grill rack 8 as shown in FIG. 2. In embodiments, this invention only requires that the right ends of the handle and the parallelogram bar be attached to some vertical portion of the grill rack in parallel relation. For that reason, this invention includes embodiments in which the parallelogram bar is positioned above the handle, as for example if in FIGS. 2 and 3 the positions of the handle 7 and the parallelogram bar 14 were to be swapped. The modifications in these last two paragraphs should also be considered equivalent to the structures described earlier.

The invention claimed is:

1. A grill top, comprising:
a means for attaching the grill top to a grill;
  the means for attaching the grill top comprising a substantially vertical post;
    the vertical post comprising an axis, an upper end, and a lower end;
      the upper end comprising a first detent part;
      the lower end comprising a means for gripping a grill;
a substantially vertical collar comprising an upper portion and a lower portion;
  the vertical collar comprising a substantially vertical hollow inner surface and an outer surface;
  the upper portion comprising a second detent part;
  the vertical hollow inner surface fitting slidably over the vertical post;
  the vertical collar being supported by the second detent part engaging the first detent part;
  the lower portion comprising at least one pawl on the outer surface;
a handle member comprising a handle end, a middle portion, and a rack end;
  the middle portion comprising a fulcrum rotatably attached to the upper portion of the vertical collar on the outer surface at a first pivot point;
at least one parallelogram bar comprising an inner bar end and an outer bar end;
a substantially horizontal rack comprising a periphery and at least one vertical lift member fixedly attached to the periphery;
  the at least one vertical lift member comprising a top end and a bottom end;
  the rack end of the handle member being rotatably attached to the top end of the at least one vertical lift member at a second pivot point;
  the inner bar end being rotatably attached to the bottom end of the at least one vertical lift member at a third pivot point a first distance vertically below the second pivot point; and
  the outer bar end being rotatably attached the lower portion of the vertical collar at a fourth pivot point the first distance below the first pivot point;
at least one ratchet bar comprising a tab at a tab end, a central portion, and a ratchet end;
  the central portion of the at least one ratchet bar being rotatably attached to a fifth pivot point on the handle member located outwardly from the fulcrum;
  the tab end and the ratchet end pivoting together about the fifth pivot point so that when the tab is moved outwardly, the ratchet end moves inwardly;
  the tab end extending above the handle and the fifth pivot point;
  the ratchet end extending below the fifth pivot point and comprising a plurality of outward-facing shaped notches;
    the shape of each of the plurality of shaped notches comprising a hook at the bottom of each notch and a smooth upper part;
  the ratchet end being biased outward by a ratchet biasing means;
  one of the plurality of outwardly-facing shaped notches engaging the at least one pawl; and
  the one of the plurality of outwardly-facing shaped notches being released from the at least one pawl by outward pressure on the tab.

2. The grill top of claim 1, wherein:
said first detent part is a substantially horizontal upward face on said substantially vertical post;
the upward face comprising a shaped groove;
said second detent part is a substantially horizontal rod spanning said substantially vertical hollow inner surface of said upper portion of said substantially vertical collar; and
said ratchet biasing means is the mass distribution of said ratchet bar.

3. The grill top of claim 1, wherein:
said at least one pawl is two pawls positioned diametrically on said outer surface of said collar;
said at least one parallelogram bar is two parallelogram bars;
said at least one vertical lift member is two vertical lift members; and
said at least one ratchet bar is two ratchet bars.

4. The grill top of claim 1, wherein:
said means for gripping a grill comprises at least one releasable clamp.

5. The grill top of claim 1, wherein:
said grill comprises an outwardly-extending horizontal flange; and
said means for gripping a grill comprises a horizontal plate fixed to said lower end of said vertical post;
the horizontal plate comprises an outwardly-facing edge; and
at least one C-clamp fixed to the outwardly-facing edge and shaped to grip the flange when tightened.

6. A grill top, comprising:
a means for attaching the grill top to a grill;
  the means for attaching the grill top comprising a substantially vertical first member;
    the vertical first member comprising a first axis, an upper end, and a lower end;
a handle member comprising a handle end, a middle portion, and a rack end;
  the middle portion comprising a fulcrum rotatably attached to the upper end of the vertical first member at a first pivot point;
at least one parallelogram bar comprising an inner bar end and an outer bar end;
a substantially horizontal rack comprising at least one vertical lift member;
  the at least one vertical lift member comprising a second pivot point vertically disposed above a third pivot point;

the rack end of the handle member being rotatably
attached to the second pivot point;
the inner bar end being rotatably attached to a third
pivot point a first distance vertically below the
second pivot point; and
the outer bar end being rotatably attached the lower
portion of the vertical first member at a fourth pivot
point the first distance below the first pivot point;
at least one pawl on the lower end of the first member;
at least one ratchet bar comprising a tab at a tab end, a
central portion, and a ratchet end;
the central portion of the at least one ratchet bar being
rotatably attached to a fifth pivot point on the handle
member located outwardly from the fulcrum;
the tab end and the ratchet end pivoting together about
the fifth pivot point so that when the tab is moved
outwardly, the ratchet end moves inwardly;
the tab end extending above the handle and the fifth
pivot point;
the ratchet end extending below the fifth pivot point
and comprising a plurality of outward-facing shaped
notches;
the shape of each of the plurality of shaped notches
comprising a hook at the bottom of each notch and
a smooth upper part;
one of the plurality of outwardly-facing shaped
notches engaging the at least one pawl; and
the one of the plurality of outwardly-facing shaped
notches being released from the at least one pawl
by pressure applied to the grill top taken from the
list consisting of:
(a) outward pressure on the tab;
(b) downward pressure on the handle end; and
(c) both (a) and (b).

7. The grill top of claim 6, comprising:
a means for biasing said ratchet end outward.

8. The grill top of claim 6, comprising:
a substantially vertical second member having a second
axis and comprising an upper portion and a lower
portion;
the lower portion comprising means for gripping a grill;
said substantially vertical first member comprising means
for supporting the second member;
the means for supporting the second member allowing
the second axis to rotate in a substantially horizontal
plane about said first axis.

9. The grill top of claim 8, comprising:
at least one pawl on the lower end of the first member;
at least one ratchet bar comprising a tab end, a central
portion and a ratchet end;
the central portion of the at least one ratchet bar being
rotatably attached to a fifth pivot point on said handle
member located outwardly from said fulcrum;
the tab end extending above said handle;
the ratchet end extending below said handle and comprising a plurality of outward-facing shaped notches;
one of the plurality of outwardly-facing shaped
notches engaging the at least one pawl; and
the one of the plurality of outwardly-facing shaped
notches being released from the at least one pawl
by outward pressure on the tab end of the ratchet
bar.

10. The grill top of claim 9, comprising:
a means for biasing said ratchet end outward.

11. The grill top of claim 7, comprising:
a substantially vertical second member having a second
axis and comprising an upper portion and a lower
portion;
the lower portion comprising means for gripping a grill;
said substantially vertical first member comprising means
for supporting the second member;
the means for supporting the second member allowing
the second axis to rotate in a substantially horizontal
plane about said first axis.

12. A grill top, comprising:
a means for attaching the grill top to a grill;
the means for attaching the grill top comprising a
substantially vertical first member;
the vertical first member comprising a first axis, an
upper end, and a lower end;
a handle member comprising a handle end, a middle
portion, and a rack end;
the middle portion comprising a fulcrum rotatably
attached to the upper end of the vertical first member
at a first pivot point;
at least one parallelogram bar comprising an inner bar end
and an outer bar end;
a substantially horizontal rack comprising a periphery and
at least one vertical lift member fixedly attached to the
periphery;
the at least one vertical lift member having an upper
end;
at least one brace having an inner brace end and an
outer brace end;
the inner brace end fixed to the periphery and the
outer brace end fixed to the upper end;
the at least one vertical lift member comprising a
second pivot point vertically disposed above a third
pivot point;
the rack end of the handle member being rotatably
attached to the second pivot point;
the inner bar end being rotatably attached to a third
pivot point a first distance vertically below the
second pivot point; and
the outer bar end being rotatably attached the lower
portion of the vertical first member at a fourth pivot
point the first distance below the first pivot point;
at least one pawl on the lower end of the first member;
at least one ratchet bar comprising a tab at a tab end, a
central portion, and a ratchet end;
the central portion of the at least one ratchet bar being
rotatably attached to a fifth pivot point on the handle
member located outwardly from the fulcrum;
the tab end and the ratchet end pivoting together about
the fifth pivot point so that when the tab is moved
outwardly, the ratchet end moves inwardly;
the tab end extending above the handle and the fifth
pivot point;
the ratchet end extending below the fifth pivot point
and comprising a plurality of outward-facing shaped
notches;
the shape of each of the plurality of shaped notches
comprising a hook at the bottom of each notch and
a smooth upper part;
one of the plurality of outwardly-facing shaped
notches engaging the at least one pawl; and
the one of the plurality of outwardly-facing shaped
notches being released from the at least one pawl by pressure applied to the grill top taken from the list consisting of:
(a) outward pressure on the tab;
(b) downward pressure on the handle end; and
(c) both (a) and (b).

* * * * *